United States Patent [19]

Yang et al.

[11] Patent Number: 5,526,355
[45] Date of Patent: Jun. 11, 1996

[54] METHOD AND APPARATUS FOR USE IN A NETWORK OF THE ETHERNET TYPE, TO IMPROVE PERFORMANCE BY REDUCING THE OCCURRENCE OF COLLISIONS IN THE EVENT OF CHANNEL CAPTURE

[75] Inventors: Henry S. Yang, Andover; Kadangode K. Ramakrishnan, Maynard; William R. Hawe, Pepperell; Anthony G. Lauck, Wellesley, all of Mass.

[73] Assignee: Digital Equipment Corporation, Maynard, Mass.

[21] Appl. No.: 447,283

[22] Filed: May 22, 1995

Related U.S. Application Data

[63] Continuation of Ser. No. 85,856, Jun. 30, 1993, abandoned.

[51] Int. Cl.[6] .................................................. H04J 3/14
[52] U.S. Cl. ...................................... 370/85.3; 370/85.2
[58] Field of Search ................................... 370/85.3, 85.2, 370/85.1, 85.4, 85.5, 85.6, 85.7, 94.1; 340/825.1, 825.06

[56] References Cited

U.S. PATENT DOCUMENTS

| | | | |
|---|---|---|---|
| 4,598,285 | 7/1986 | Hoshen | 370/85.2 |
| 4,707,829 | 11/1987 | Pendse | 370/85.6 |
| 4,766,591 | 8/1988 | Hyung | 370/60 |
| 4,979,168 | 10/1990 | Courtois et al. | 370/95.1 |
| 5,164,942 | 11/1992 | Kamerman et al. | 370/85.2 |

FOREIGN PATENT DOCUMENTS

| | | | |
|---|---|---|---|
| 32550 | 2/1989 | Japan | 370/85.2 |

OTHER PUBLICATIONS

Spragins, Telecommunications Protocols and Design, 1991 by Addison–Wesley Publishing Co., Inc.

*Primary Examiner*—Melvin Marcelo
*Assistant Examiner*—Huy D. Vu
*Attorney, Agent, or Firm*—Kenneth F. Kozik

[57] ABSTRACT

A technique for modifying the IEEE 802.3 standard for selecting transmit-to-transmit interpacket gap (IPG) intervals in a Carrier Sense Multiple Access with Collision Detection (CSMA/CD) network, to provide fairness and good channel utilization in the event that a node has captured the network communication channel. If there is a small number of active nodes on the network, one node may capture the channel and the standard backoff algorithm makes it increasingly unlikely for another node to transmit. The new technique provides for use of a longer interpacket gap (IPG) interval to be used by a node that has been initially unsuccessful in contention for the channel, thereby ensuring that the other node may continue to transmit back-to-back data packets without interruption or collision. After a preselected time interval, the nodes reverse their roles by selecting the opposite IPG intervals. The initial receiver now selects the shorter IPG interval and captures the channel for the preselected time interval.

4 Claims, 3 Drawing Sheets

METHOD AND APPARATUS FOR USE IN A NETWORK OF THE ETHERNET TYPE, TO IMPROVE PERFORMANCE BY REDUCING THE OCCURRENCE OF COLLISIONS IN THE EVENT OF CHANNEL CAPTURE

This application is a continuation of application Ser. No. 08/085,856, filed Jun. 30, 1993 abandoned.

BACKGROUND OF THE INVENTION

This invention relates generally to local area networks (LANs) of the Ethernet type and, more particularly, to techniques for improving fairness of channel access in an Ethernet LAN. Ethernet is a commonly used name for a LAN that uses a network access protocol referred to as Carrier Sense Multiple Access with Collision Detection (CSMA/CD). The CSMA/CD protocol is defined in ANSI/IEEE Std 802.3, published by the Institute of Electrical and Electronics Engineers, Inc., 345 East 45th Street, New York, N.Y. 10017, and referred to in this specification as "the IEEE 802.3 standard." The standard is for a 10 Mbs (megabits/sec) CSMA/CD channel, but it will be understood that the present invention may also be applicable to a 100 Mbps channel.

Under the CSMA/CD rules for access to a network bus or cable, which will be referred to as the channel, any node or station wishing to transmit must first "listen" to make sure that the channel is clear before beginning to transmit. All nodes on the network have equal priority of access and may begin transmitting as soon as the channel is clear and a required inter-packet delay of 9.6 µs (microseconds) has elapsed. However, if a first node that has started transmitting detects a "collision" with a transmission from another node, the first node continues transmitting for a short time to make sure that all nodes wishing to transmit will detect the collision. Every other node detecting the collision also continues to transmit for a short time. Then each node that has detected a collision terminates transmission of the packet or frame. The nodes involved in the collision wait for the required interpacket delay of 9.6 µs and then select random, and therefore usually different, delay times, referred to as backoff times, before trying transmission of the same packet again.

More specifically, the IEEE 802.3 standard defines a collision backoff procedure referred to as "truncated binary exponential backoff." When a transmission attempt has terminated due to a collision, it is retried by the transmitting node, after a selected backoff time, until either the transmission is successful or a maximum number of attempts have been made and all have terminated due to collisions. The backoff time is selected by each node as an integral multiple of the "slot time," which is the maximum round-trip propagation time for the network, i.e. the time to propagate a data packet from one end of the network to the other, and back. The slot time defined by the IEEE 802.3 standard is 51.2 µs. The number of slot times selected as the backoff time before the nth retransmission is chosen as a randomly distributed integer r in the range:

$$0 \leq r < 2^k, \text{ where } k = \min(n, 10)$$

Therefore, for the first attempted retransmission the backoff time is selected as 0 or 1 slot times, for the second attempted retransmission the backoff time is selected as 0, 1, 2 or 3 slot times, for the third attempted retransmission the backoff time is selected as 0, 1, 2, 3, 4, 5, 6 or 7 slot times, and so forth. The maximum backoff time, for the tenth attempted retransmission may be up to $2^{10}-1$, or 1,023 slot times, i.e. 52.4 ms.

The IEEE 802.3 standard is designed to achieve optimal performance, in throughput, latency and fairness, when the number of nodes in the network is relatively large. When the number of active nodes, i.e. nodes having data packets to transmit, is small, e.g. two nodes, the IEEE 802.3 standard exhibits an undesirable effect referred to as the capture effect, in which one of the nodes may effectively capture the channel and transmit a succession of data packets in a back-to-back fashion for a relatively long period of time. The capture effect is best understood from a simple example.

Suppose there are two active nodes, A and B, in a network and they begin transmitting at approximately the same time, resulting in a first collision. They each select backoff times of 0 or 1 slot time, in accordance with the standard backoff algorithm. Suppose further that node A selects zero backoff time and node B selects one slot time as its backoff time. Obviously, node A will be able to successfully transmit on its first attempt at retransmission. Node B will wait a full slot time before making its first retransmission attempt, but by this time node A has started transmitting a second packet, i.e. node A is transmitting successive packets back-to-back, with only the required interpacket gap (IPG) separating them. Node B experiences a second collision on its first data packet, but for node A it is still a "first" collision for trying to transmit a second data packet. In accordance with the standard backoff algorithm, node A selects a backoff of 0 or 1 slot time, but node B selects a backoff of 0, 1, 2 or 3 slot times. Therefore, node B has only one chance in eight of winning access to the channel (if node B chooses 0 and node A chooses 1). Node A, however, has five chances in eight of winning channel access. (Two of the eight possibilities will result in another collision.) Clearly, it is more probable, actually five times more probable, that node A will retain access to the channel, as compared with node B. If the probable occurs, and node A transmits its second data packet, the situation becomes progressively more difficult for node B to transmit. If another collision occurs on node B's next attempt to retransmit, this will be node B's third attempt, but node A's "first" again. Node A's backoff is still 0 or 1 slot time, but node B's is selected from 0 through 7 slot times. Node A is then thirteen times as likely to win access to the channel on the next attempted retransmission. For the nth attempt at retransmission by node B, node A will be $(2^n-3)$ times more likely to win access to the channel. For the maximum value of n, i.e. 10, the unfairness factor between the two active nodes will be $2^{10}-3$, or 1,021.

For network protocols that require a receiving node to acknowledge that it has received a packet, the situation is further aggravated by the need to transmit acknowledgment messages on the network. For example node A captures the channel and is sending successive packets to node B, node B may be unable to acknowledge even the first received packet. Node A will eventually have to give up the channel to allow acknowledgements to flow back from node B, but this is an inefficient process and channel utilization goes down.

It is important to understand the effect of the interpacket gap (IPG) when one node has captured the channel. For example, consider the case in which two nodes (A and B) are contending for the channel before capture may be said to have occurred. (Again, nodes A and B are assumed to have messages to transmit, and to be the only active nodes on the network.) After a collision, node A selects a backoff time of zero and node B a backoff time of one time slot. Therefore, node A waits just for the IPG interval and begins transmitting again. At this point node A is considered to have captured the channel. Node B waits for its one time slot backoff interval, then checks to see if the channel is idle, but has to wait until node A finishes transmitting a second packet.

The standard rules with regard to IPG intervals are structured such that all nodes must wait for one IPG interval following first sensing channel inactivity at the end of a packet transmission. This applies to node A in the example, which has just finished transmitting a second packet, and to node B, which has sensed that another node has finished transmitting. As soon as the channel becomes idle, node A must observe a "transmit-to-transmit" IPG and node B must observe a "receive-to-transmit" IPG. Both IPG intervals are the same (9.6 µs), so inevitably both nodes will again be contending equally for the channel at the end of the IPG. This equality of node status in the contention is designed to be fair in the situation when many nodes are competing for channel access. However, use of a uniform IPG value in conjunction with the standard backoff algorithm exhibits an element of unfairness when one of two nodes has captured the channel. Moreover, the use of uniform IPG intervals leads to an increased number of collisions and thereby results in poorer performance.

It will be appreciated from the foregoing that there is a need for improvement over the standard approach that uses uniform IPG intervals in a network using the CSMA/CD protocol. Ideally, any improved technique should still comport with the objects of the IEEE 802.3 standard and should be compatible with nodes that use the standard without improvement. The present invention achieves these ends, as will become apparent from the following summary.

SUMMARY OF THE INVENTION

The present invention resides in a technique that modifies the standard use of a uniform interpacket gap (IPG) to allow two nodes to alternate between transmit and receive modes of operation without collisions. The basic method of the invention is for use in a node of a network employing a Carrier Sense Multiple Access with Collision Detection (CSMA/CD) protocol to control channel access. The method includes the steps of limiting the period during which a node may be operated continuously in a back-to-back transmit mode or a receive mode, and selecting a standard or relatively short IPG when in the transmit mode, but a longer IPG interval when in the receive mode. Two nodes operating in accordance with the invention will alternate between back-to-back transmit and receive modes, and the different IPG intervals for transmit and receive operations permit continuous, but alternating, back-to-back operation with minimal contention for channel access.

More specifically, the method comprises the steps of determining, after a collision, whether a node (A) has initially won or lost access to the network channel; if node (A) has initially won channel access, beginning to transmit a succession of data packets separated by standard or relatively short interpacket gap (IPG) intervals; in another node (B) that has initially lost access to the channel, selecting a relatively long IPG interval to ensure that node B continues to operate as a receiver and to ensure that there will be no further collisions; and starting separate back-to-back timers in nodes A and B when the first data packet is transmitted and received, respectively. The method further comprises the steps of checking the back-to-back timers in nodes A and B after every packet transmission and reception, respectively; and, upon expiration of the timer in node A, imposing a long delay during which further transmission of data is deferred, then selecting the long IPG interval for node A. Upon expiration of the timer in node B, the method includes the steps of selecting the standard or relatively short IPG interval and initiating transmission of a data packet, whereby the long delay by node A permits node B to assume the role of back-to-back transmitter. Nodes A and B alternate transmit and receive functions without the need for collisions to resolve contentions for the network channel.

The invention may also be expressed in terms of apparatus, including a timer to limit the period during which a node may be operated continuously in a back-to-back transmit mode, and alternately in a receive mode, and means for selecting a standard or relatively short IPG interval when the node is in the transmit mode and a longer IPG interval when the node is in the receive mode.

More specifically, the apparatus of the invention comprises means operable after a collision, for determining whether a node (A) has initially won or lost access to the network channel; means operable if node (A) has initially won channel access, for transmitting a succession of data packets separated by standard interpacket gap (IPG) intervals; means operable in another node (B) that has initially lost access to the channel, for selecting a relatively long IPG interval to ensure that node B continues to operate as a receiver and to ensure that there will probably be no further collisions. The apparatus also includes means for starting separate back-to-back timers in nodes A and B when the first data packet is transmitted and received, respectively; means for checking the back-to-back timers in nodes A and B after every packet transmission and reception, respectively; means operable upon expiration of the timer in node A, for imposing a long delay during which further transmission of data is deferred, then selecting the long IPG interval for this node; and means operable upon expiration of the timer in node B, for selecting the standard or relatively short IPG interval and initiating transmission of a data packet.

It will be appreciated from the foregoing that the present invention represents a significant advance in the field of local area networks of the Ethernet or IEEE 802.3 type. In particular, the invention provides an improved procedure wherein the interpacket gap (IPG) interval is selected to be longer for a node that initially loses in a contention for channel access, as compared with the standard value that continues to be used in the node that initially wins access. The two active nodes alternate receive and transmit functions and the invention improves fairness of channel access and channel utilization, while reducing the number of collisions for channel access. Other aspects and advantages of the invention will become apparent from the following more detailed description, taken in conjunction with the accompanying drawings.

DESCRIPTION OF THE PREFERRED EMBODIMENTS

Figure 1:
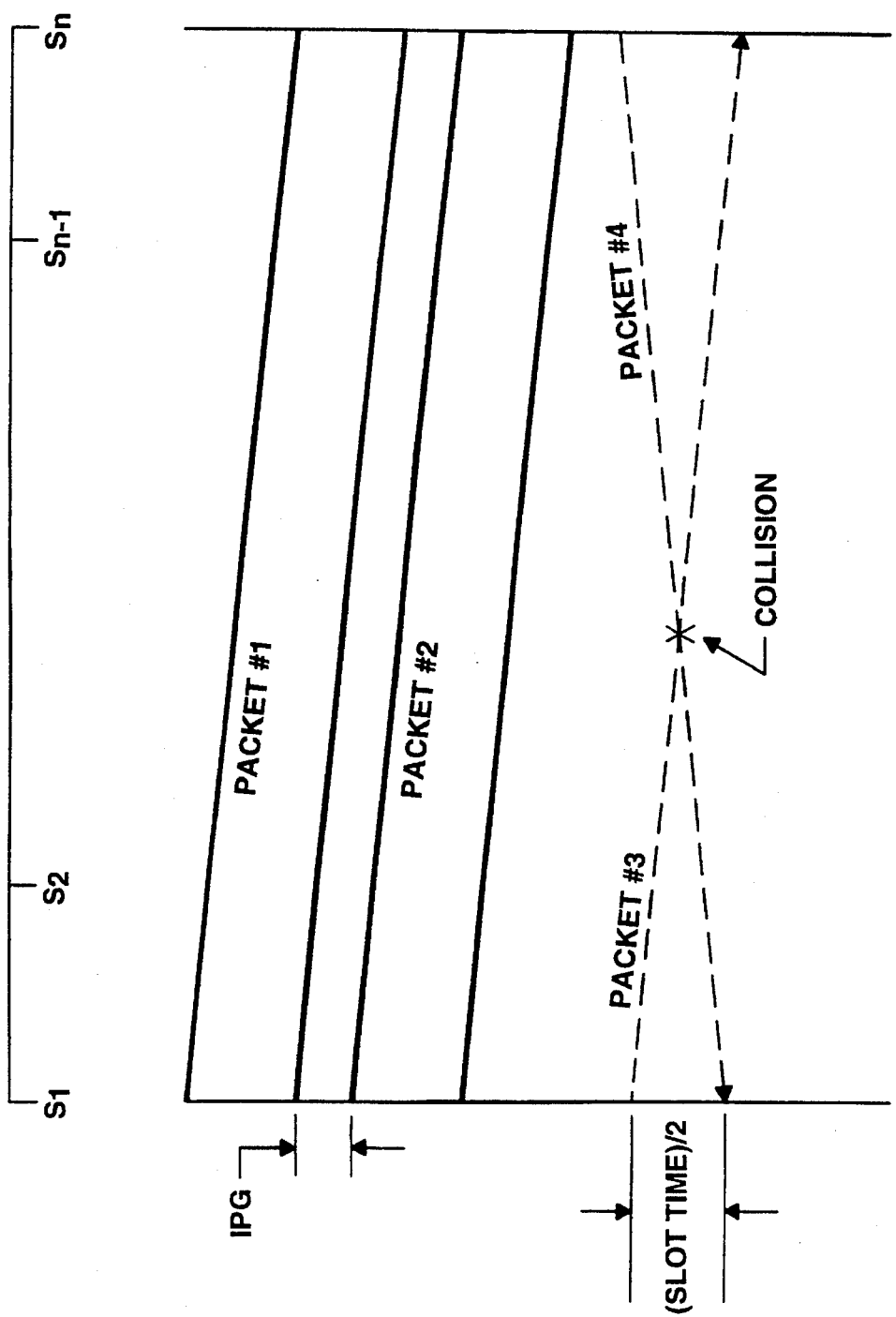
FIG. 1 is a diagram showing the principles of collision detection in a CSMA/CD LAN.

As shown in the drawings for purposes of illustration, the present invention is concerned with an improved technique for interpacket gap (IPG) intervals in a LAN that uses a network access protocol referred to as Carrier Sense Multiple Access with Collision Detection (CSMA/CD). Under the CSMA/CD rules for access to a network channel, any node wishing to transmit must first "listen" to make sure that the channel is idle before beginning to transmit. All nodes on the network have equal priority of access and may begin transmitting as soon as the channel is idle and a required inter-packet delay has elapsed.

FIG. 1 is a graphical diagram that is useful in visualizing channel access concepts in a LAN of the Ethernet or IEEE 802.3 standard type. The horizontal axis of the diagram represents distance along the channel from a first node $S_1$ on the left-hand side to an nth node $S_n$ on the right-hand side. The vertical axis represents time. The area designated Packet #1 represents the transmission of a data packet by node $S_1$ onto the channel. The vertical dimension of this area indicates that the packet takes a certain time for $S_1$ to transmit it. The downward slope of the area is consistent with the propagation delay associated with the packet as it is transmitted along the channel. Thus node $S_n$ receives the packet some time after it was transmitted.

After transmitting Packet #1, node $S_1$ waits for a required interpacket gap (IPG) time, which the standard defines as 9.6 µs, and if no other channel activity is detected, begins transmitting another packet, as indicated by the area "Packet #2." This is a back-to-back transmission of successive data packets, and thus far it has been assumed that there was no competition for access to the channel.

The next portion of FIG. 1 shows the effect of practically simultaneous transmission attempts from nodes $S_1$ and $S_n$. Transmission of Packets #3 and #4 were both started after the transmitting nodes detected an idle channel. The packets collide in mid-channel, as indicated diagrammatically in FIG. 1, and an indication of the collision is provided to the transmitting nodes, and to all the other nodes, as indicated by the broken lines in the figure. It will be appreciated from the figure that the time for node $S_1$ to learn of the collision is the round-trip propagation time from the transmitting node to the collision point, and back. It will also be appreciated that the collision point may be almost at the other end of the channel, adjacent to node $S_n$. Then the delay in learning of the collision would be the round-trip propagation time from one end of the channel to the other. This time is referred to as one slot time, and is defined by the IEEE 802.3 standard as a maximum of 51.2 µs.

In the event of a collision, each active node defers its next attempt to transmit by a random time that is an integral multiple r of the slot time. Specifically, for the nth attempt at retransmission r is chosen to from the range:

$$0 \leq r < 2^k, \text{ where } k = \min(n, 10)$$

Therefore, the backoff time is selected from the following ranges of times, depending on how many retransmission attempts have been made:

| Retransmission attempt no. n | Backoff time in slot times r (selected at random from:) |
| --- | --- |
| 1 | 0,1 |
| 2 | 0,1,2,3 |
| 3 | 0,1,2,3,4,5,6,7 |
| 4 | 0 through 15 |
| n | 0 through $(2^n - 1)$ |
| 10 (maximum n) | 0 through 1,023 |

The standard backoff algorithm is designed to achieve optimal performance, in throughput, latency and fairness, when the number of nodes in the network is relatively large. When the number of active nodes, i.e. nodes having data packets to transmit, is small, e.g. two nodes, the IEEE 802.3 standard exhibits an undesirable effect referred to as the capture effect, in which one of the nodes may effectively capture the channel and transmit a succession of data packets in a back-to-back fashion for a relatively long period of time. The capture effect arises because the range of backoff times increases exponentially with the number of retransmission attempts. If one of two active nodes loses channel access, the losing node has a progressively decreasing probability of gaining access so long as the other node continues to transmit back-to-back packets.

Figure 2:
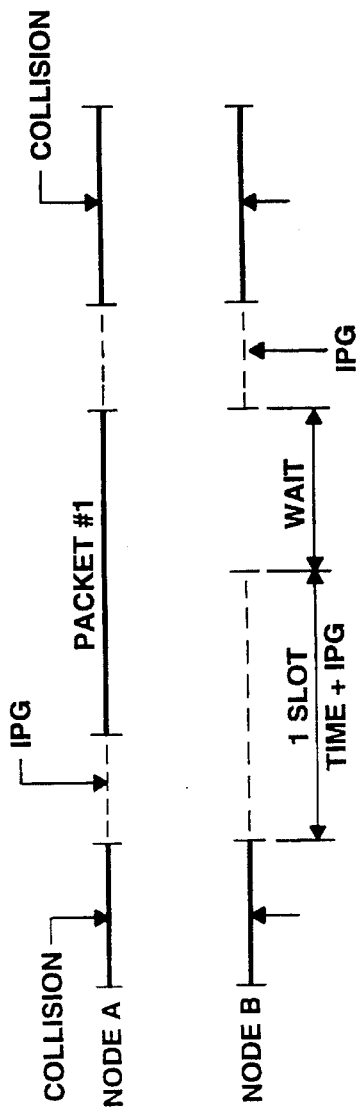
FIG. 2 is a diagram illustrating the use of a standard interpacket gap (IPG) interval.

FIG. 2 shows how the requirement for a fixed IPG interval, in conjunction with the standard backoff algorithm, can work an unfairness in the channel capture situation. Nodes A and B are first contending for channel access, before channel capture may be said to have occurred, and it is assumed that both nodes have messages ready to transmit. Upon a collision between nodes A and B, each will select a backoff time at random between 0 and 1 slot times. If both select the same backoff time, both will begin retransmitting at the same time and there will be another collision. But if one node (say node A) selects a zero backoff time and node B selects one slot time for backoff, then node A will "win" access to the channel, since it can begin retransmitting after waiting for the IPG interval to pass. Node B waits one slot time, then must wait for an idle channel, since node A has begun retransmission and can, at this point, be considered to have captured the channel.

At the end of node A's successful attempt at retransmission, both nodes will wait for the required IPG interval and begin transmitting again. There will be an inevitable collision and a resulting selection of backoff times, which now strongly favors the channel-capturing node (A). It will be apparent that the use of uniform IPG intervals results in an increased likelihood of collisions, and therefore poor channel utilization and performance.

In accordance with the present invention, the transmit-to-transmit IPG interval and the receive-to-transmit IPG interval are controlled in a manner that reduces the number of collisions between a channel-capturing node and another node, and increases fairness of access in channel capture situations. Basically, the method of the invention senses that a node has won access to the channel, and avoids further collisions for a fixed time interval, allowing the winning node to capture the channel for that interval and forcing the other node to operate as a receiver. When the fixed time interval has expired, the roles of the two nodes are reversed, and the one that operated as a receiver is now permitted to capture the channel for the next fixed time interval. The two nodes alternate the roles of channel capturer and receiver, permitting the network to operate efficiently without collisions.

The mechanism employed to ensure this alternation of transmitter and receiver functions is the interpacket gap (IPG) that must be observed by each node between cessation of channel activity and the beginning of a transmission or retransmission attempt. When there is contention between two nodes A and B, and a resulting collision, the node that wins channel access after the collision (node A) sets its interpacket gap at the standard value of 9.6 μs, but the node that loses channel access (node B) sets its IPG interval at a longer value, say 13 μs. The longer value applies both to the receive-to-transmit and the transmit-to-transmit IPG intervals. After node A transmits a packet, node A waits only 9.6 μs to begin a second transmission. Because node B waits longer to attempt a transmission, node B will be unable to begin its transmission and node A will have effectively captured the channel.

So long as node A has packets to transmit, it will be able to continue to transmit them without collision with node B packets. Node A starts a back-to-back timer as soon as its first packet has been transmitted. Node B starts a similar timer upon completion of receipt of the first packet from node A. At the end of a fixed time interval, the back-to-back timer in node A expires, indicating that it is time to switch to receive mode. Node A first waits out a delay of one slot time, which allows node B to capture the channel. Node A then selects the long IPG interval and waits to receive data packets.

Node B, upon expiration of the back-to-back timer, switches to the short (standard) IPG interval and begins transmitting during the one slot time of inactivity of node A. Now node B assumes the role of capturer of the channel, and begins transmitting back-to-back packets. Since node A has now switched to the long IPG interval, a prolonged burst of data packets can be transmitted by node B.

Figure 3:
FIG. 3 is a diagram illustrating the principles of the present invention.
Figure 3:
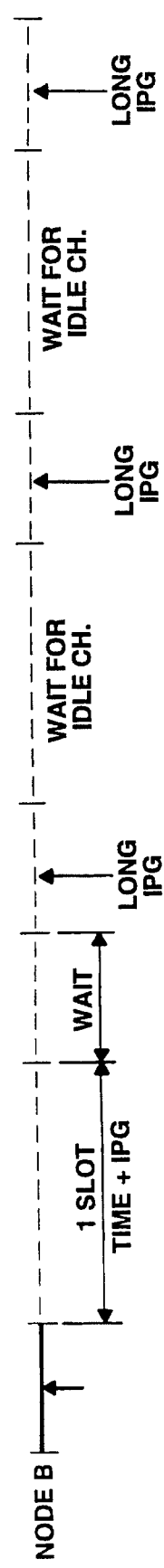

FIG. 3 shows diagrammatically how increasing the IPG interval for a node (B) that failed to gain channel access operates to ensure that node A will capture the channel. After expiration of the back-to-back time T, the nodes switch roles and node B captures the channel. Thus the two nodes alternate transmission bursts and achieve high channel utilization without collisions.

Figure 4:
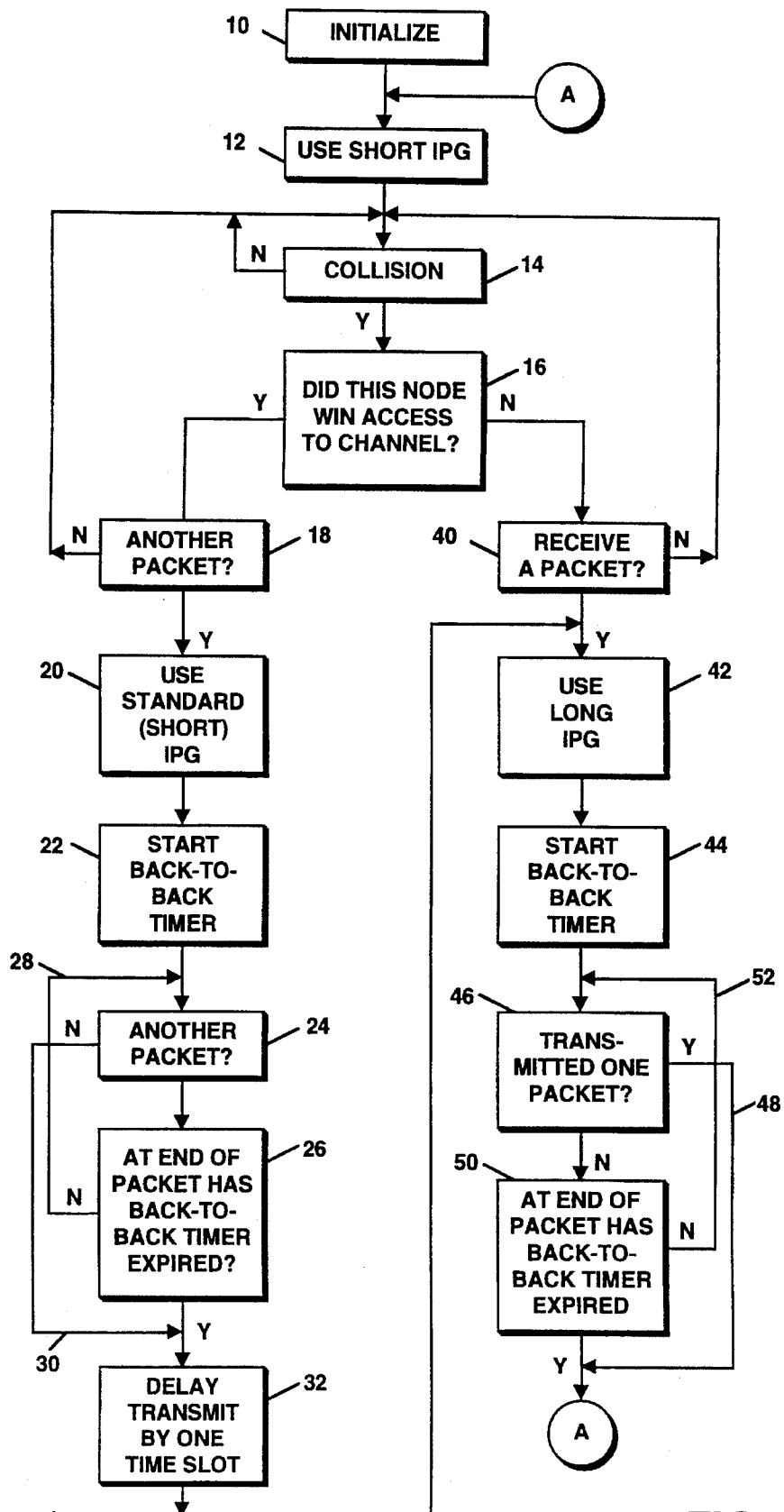
FIG. 4 is a flowchart showing the principles of the present invention.

FIG. 4 is a flowchart showing the functions performed in each node implementing this improved feature. After setting various initial conditions, as indicated at 10, the node selects the standard, or relatively short, IPG interval, as indicated in block 12. Then, upon detection of a collision, in block 16, the node determines whether it was successful in the contention for channel access. The node is successful if, upon completion of its selected backoff time, it is able to transmit onto the channel. The node is unsuccessful if it finds the channel already busy at the end of the backoff time.

Next the successful node determines, as indicated in block 18, whether there is another packet to transmit, in addition to the one for which channel access was sought in the contention process. If there is no other packet to transmit, the node continues to operate normally under a "low load" condition, without benefit of, or need for, the invention. For example, if the node has only one transmit every second or so, it will have no need for the improvement provided by the invention, and will wait for the detection of another collision, returning to block 14.

A successful node having at least another packet to send will continue to use the standard IPG interval of 9.6 μs after each transmitted packet, as indicated at 20, and will start a back-to-back timer, as indicated at 22. The back-to-back timer measures the maximum time, i.e. provides an upper bound, for operation in a back-to-back transmit mode. The timer measures a relatively long time interval, such as 4 ms (milliseconds). While in the transmit mode and waiting for the back-to-back timer to expire, the node continually checks to see if there is another packet to transmit, as indicated at 24. If there is one, the transmitting node determines, at the end of each successive packet that is transmitted, whether the back-to-back timer has expired, as indicated at 26. If the timer has not expired, the successful node continues to operate in the transmit mode, and continues using the short or standard IPG interval, as indicated by the path 28. The node may exit this loop before expiration of the back-to-back timer, if the node determines that there are no additional packets to transmit, as indicated by path 30.

After the node leaves the transmit mode, either because the back-to-back timer has expired or because there are no additional packets to transmit, it imposes on itself a relatively long delay of one slot time, as indicated in block 32, and takes transition path 34 to the right-hand path of the flowchart, to be explained below. The long delay allows a node operating in receive node to switch over to transmit mode.

An unsuccessful node, as determined in block 16, first determines whether it has received a packet, as indicated in block 40. The unsuccessful node does not enter the receive mode unless it has received a packet. In receive mode, the node selects a long value to use as its IPG interval, as indicated in block 42. The long value may be, for example, 13 μs. Use of this long IPG interval ensures that the node will continue to be denied access to the channel and will operate only as a receiver of data packets from the transmitting node. The unsuccessful node starts its own back-to-back timer, as indicated in block 44, in near synchronism with the successful node's, i.e. on receiving the end of the first packet. The timer sets an upper bound on the amount of time spent in the receive mode.

If the transmitting node stops transmitting packets before the back-to-back timers have expired, the receiving node may have an opportunity to transmit a packet of its own, and there is then obviously no reason to stay in receive mode. Block 46 determines whether the node in receive mode has transmitted a packet, and if so, provides for exit from the receive mode of operation (by path 48 to connector A). So long as the node stays in the receive mode, it determines, at the end of each received packet, whether the back-to-back timer has expired, as indicated in block 50. If not, the node continues in receive mode loop, over path 52, using the long IPG interval and continuing to operate only as a receiver.

When the back-to-back timer in the transmitting node expires, the node delays any further attempt to transmit by a slot time (block 32) and switches to the use of the long IPG interval, taking path 34 to block 42. The node then continues operating as if it were in the receive mode. Shortly thereafter, the back-to-back timer in the original receiving node expires and this node switches to transmit mode, by following connector A to block 12, where the short IPG is selected. The node then takes advantage of the long delay left by the other node, and transmits its first packet, continuing to operate as the transmitting node, by using the short IPG interval, as indicated in block 14. In this way, two nodes alternate transmit and receive modes of operation, and a relatively large amount of data is transmitted without the need for contention for the channel.

It will be understood, of course, that other forms of processing take place in the node, but these have been omitted for clarity.

The invention allows nodes in a CSMA/CD network to have improved performance when the network has only a small number of active nodes. The invention is becoming of increasing usefulness because there appears to be a trend toward LAN segments having fewer nodes, to provide more bandwidth to users. These smaller networks are more likely to expose the capture effect, which results in performance degradation. The invention applies equally well to 100 Mbps CSMA/CD LANs and to 10 Mbps CSMA/CD LANs. Moreover, nodes implementing the invention interoperate without modification with nodes using the IEEE 802.3 standard for IPG intervals.

It will be appreciated from the foregoing that the present invention represents a significant advance in the field of CSMA/CD LANs. In particular, the invention provides for greatly improved fairness of access to a LAN channel when there is a small number of active nodes on the network. From a user standpoint, improved fairness also improves overall message throughput and latency. It will also be appreciated that, although an embodiment of the invention has been described in detail by way of example, various modifications may be made without departing from the spirit and scope of the invention. Accordingly, the invention should not be limited except as by the appended claims.

We claim:

1. For use in two nodes of a network employing a Carrier Sense Multiple Access with Collision Detection (CSMA/CD) protocol for channel access, a method for improving channel utilization and fairness of access, comprising the steps of:

after a collision, determining whether this node, A, has initially won or lost access to a network channel;

if this node A has initially won channel access, beginning to transmit a succession of data packets separated by standard or relatively short interpacket gap, IPG, intervals;

in another node, B, that has initially lost access to the channel, selecting a relatively long IPG interval to ensure that node B operates as a receiver and to ensure that there will be no further collisions;

starting separate back-to-back timers in nodes A and B when the first data packet is transmitted and received, respectively;

checking the back-to-back timers in nodes A and B after every packet transmission and reception, respectively;

upon expiration of the timer in node A, imposing a long delay during which further transmission of data is deferred, then selecting the long IPG interval for this node;

upon expiration of the timer in node B, selecting the standard or relatively short IPG interval and initiating transmission of a data packet, whereby the long delay by node A permits node B to function as a back-to-back transmitter;

wherein nodes A and B alternate transmit and receive functions without need for collisions to resolve contentions for the network channel.

2. For use in two nodes of a network employing a Carrier Sense Multiple Access with Collision Detection (CSMA/CD) protocol for channel access, apparatus for improving channel utilization and fairness of access, the apparatus comprising:

means operable after a collision, for determining whether this node, A, has initially won or lost access to a network channel;

means operable if this node A has initially won channel access, for transmitting a succession of data packets separated by standard or relatively short interpacket gap, IPG, intervals;

means operable in another node, B, that has initially lost access to the channel, for selecting a relatively long IPG interval to ensure that node B operates as a receiver and to ensure that there will be no further collisions;

means for starting separate back-to-back timers in nodes A and B when the first data packet is transmitted and received, respectively;

means for checking the back-to-back timers in nodes A and B after every packet transmission and reception, respectively;

means operable upon expiration of the timer in node A, for imposing a long delay during which further transmission of data is deferred, then selecting the long IPG interval for this node;

means operable upon expiration of the timer in node B, for selecting the standard or relatively short IPG interval and initiating transmission of a data packet, whereby the long delay by node A permits node B to function as a back-to-back transmitter;

wherein nodes A and B alternate transmit and receive functions without need for collisions to resolve contentions for the network channel.

3. For use in a node of a network employing a Carrier Sense Multiple Access with Collision Detection (CSMA/CD) protocol for channel access, apparatus for improving channel utilization and fairness of access, the apparatus comprising:

a timer, the timer enabling operation of the node alternately in a back-to-back transmit mode and in a receive mode over a fixed duration; and means for selecting a standard or relatively short interpacket gap, IPG, interval when the node is in the back-to-back transmit mode, and a longer IPG value when the node is in the receive mode, whereby successive data packets can be transmitted while in the back-to-back transmit mode, with minimal contention for channel access, because a shorter IPG provides priority of channel access over another node using a longer IPG.

4. For use in a node of a network employing a Carrier Sense Multiple Access with Collision Detection (CSMA/CD) protocol for channel access, a method for improving channel utilization and fairness of access, the method comprising the steps of:

operating the node alternately in a back-to-back transmit mode in which the node transmits successive packets of data without intervening transmissions from other nodes, and in a receive mode;

limiting the time of operation of the node in back-to-back transmit mode and receive mode; and selecting a standard or relatively short interpacket gap, IPG, interval when the node is in the back-to-back transmit mode, and a longer IPG interval when the node is in the receive mode, whereby successive data packets can be transmitted while in the back-to-back transmit mode, with minimal contention for channel access, because a shorter IPG provides priority of channel access over another node using a longer IPG.

* * * * *